US008955725B2

(12) United States Patent
Turner

(10) Patent No.: US 8,955,725 B2
(45) Date of Patent: Feb. 17, 2015

(54) LIQUID TANK AND SUPPORT

(76) Inventor: Mark A. Turner, Litchfield Park, AZ (US)

(*) Notice: Subject to any disclaimer, the term of this patent is extended or adjusted under 35 U.S.C. 154(b) by 214 days.

(21) Appl. No.: 13/358,759

(22) Filed: Jan. 26, 2012

(65) Prior Publication Data
US 2013/0193178 A1 Aug. 1, 2013

(51) Int. Cl.
B60R 9/00 (2006.01)
B60R 9/06 (2006.01)
B62D 43/02 (2006.01)

(52) U.S. Cl.
CPC .. *B60R 9/06* (2013.01); *B62D 43/02* (2013.01)
USPC ............ 224/42.12; 224/42.14; 224/511

(58) Field of Classification Search
CPC ........... B65D 21/0204; B65D 21/0201; B65D 21/02; B62D 43/02; B62D 43/05; B60R 9/06
USPC ........ 224/42.12–42.14, 42.37, 511; 220/23.4, 220/23.2, 23.83, 694; 211/23, 49.1; 403/326, 329
See application file for complete search history.

(56) References Cited

U.S. PATENT DOCUMENTS

| 2,440,805 | A | * | 5/1948 | Lyon | 206/304.1 |
| 2,852,174 | A | * | 9/1958 | Mauerer | 224/42.14 |
| 3,924,787 | A | * | 12/1975 | Gothrup | 224/515 |
| 5,082,129 | A | * | 1/1992 | Kramer | 215/221 |
| 5,118,017 | A | * | 6/1992 | Buck | 224/42.13 |
| 5,699,925 | A | * | 12/1997 | Petruzzi | 220/4.27 |
| 6,269,967 | B1 | * | 8/2001 | de Vries | 220/669 |
| 6,910,669 | B2 | * | 6/2005 | Gates et al. | 248/503 |
| 2007/0000922 | A1 | * | 1/2007 | Vovan et al. | 220/4.27 |

FOREIGN PATENT DOCUMENTS

GB 2182304 A * 5/1987 ............ B65D 21/02

* cited by examiner

*Primary Examiner* — Adam Waggenspack
(74) *Attorney, Agent, or Firm* — The von Hellens Law Firm, Ltd.

(57) ABSTRACT

An auxiliary tank for a liquid is removably mounted on a rod extending from a support attached to selected threaded studs supporting a spare tire on a vehicle. A plurality of snaplock elements retain the tank locked with the support. A second tank for a liquid may be mounted on the rod adjacent the first tank. A further plurality of snaplock elements interlock the two tanks with one another. To prevent unauthorized removal of the tank(s), a conventional padlock is engaged with a passageway at the end of the rod. A variant support includes a flange for attachment to a bumper, running board, or the like, of a vehicle.

19 Claims, 5 Drawing Sheets

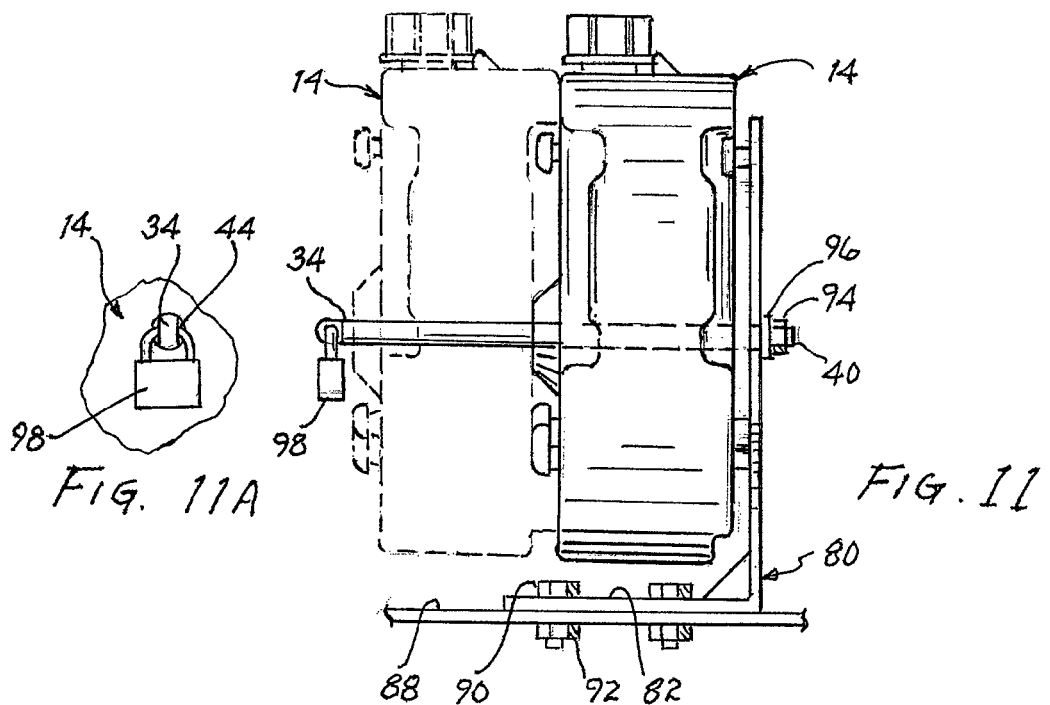
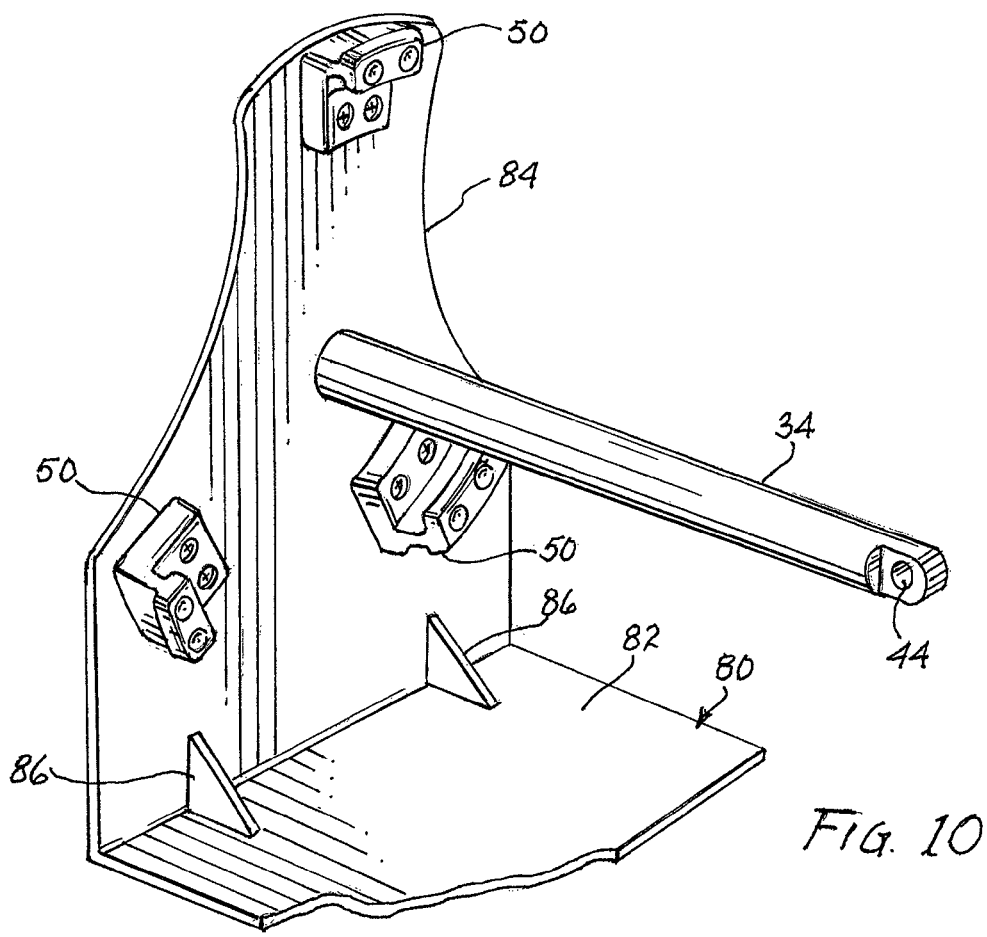

LIQUID TANK AND SUPPORT

BACKGROUND OF THE INVENTION

1. Field of the Invention

The present invention relates to liquid tanks and, more particularly, to liquid tanks and supports for mounting same.

2. Description of Related Prior Art

Various types of vehicles are used in conjunction with off-road travel. These vehicles may be of a conventional type licensed for use on state highways. An example of a commonly used vehicle of this type is known as a Jeep. Jeeps used for this purpose may be either stock or modified and/or adapted for boulder strewn terrain or sand dunes. Modifications for these purposes generally include oversize tires, suspension modifications and guards to protect the engine, the differential(s), and the transmission from contact with the terrain.

Numerous types of vehicle specifically built for off-road use have been developed over the years. Generally, these types of vehicles are not licensed for conventional road use.

Depending on the terrain to be traversed, more powerful engines may be substituted for conventional engines in licensed vehicles. For the off-road type vehicles, powerful engines are generally used to provide both high speed and the power to navigate steep hills or very rough terrain.

The powerful engines used have a high rate of gas consumption. For extended off-road excursions, gasoline in excess of the capacity of the fuel tank mounted therein may be required to ensure that the destination is reached. Conventionally, additional gasoline may be carried in gas containers of the surplus military type known as 5 gallon Jerry cans. A mounting bracket for each Jerry can includes a shelf with a perimeter lip to support the bottom of the Jerry can and one or more straps envelop the midsection of the Jerry can to prevent disengagement. While this mode of transporting extra gas is relatively inexpensive, there are some drawbacks. The location for attaching the mounting generally impedes or restricts movement of passengers. Moreover, it may serve as an impediment for loading and unloading supplies and the like. Furthermore, a fire hazard may be created if the vehicle rolls and causes the Jerry can to burst.

SUMMARY OF THE INVENTION

The present invention is directed to a support mountable on a vehicle for removably supporting one or more liquid tanks. A rod extends from the support through penetrable engagement with each liquid tank. Snaplock elements engage the liquid tank with the support. One or more further liquid tanks may be mounted on the rod. Further snaplock elements secure each further liquid tank with a previously mounted liquid tank to accommodate a plurality of detachably attached liquid tanks mountable on the rod of the support. Each of these liquid tanks may be filled with gasoline, water, or other fluid that may be anticipated to be needed during travel of the vehicle. A padlock, or the like, engages the tip of the rod extending from the support to prevent unauthorized removal of a liquid tank.

It is therefore a primary object of the present invention to provide one or more liquid tanks detachably attached to a support.

Another object of the present invention is to provide a support and one or more liquid tanks mounted thereupon for use with an off-road vehicle.

Still another object of the present invention is to provide snaplock elements for lockingly engaging a liquid tank with a support.

A further object of the present invention is to provide snaplock elements for securing two or more liquid tanks to one another and to a support.

A yet further object of the present invention is to provide a support for one or more liquid tanks detachably attached to the threaded studs for supporting a spare wheel of a vehicle.

A still further object of the present invention is to provide a support having a rod penetrably engaging one or more liquid tanks and mountable upon a vehicle.

A yet further object of the present invention is to provide a method for supporting one or more liquid tanks on a vehicle.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 10 is a detailed view of the front of a variant support;

FIG. 11 illustrates the variant support with one or more liquid tanks mounted thereon;

FIG. 11A is a detail view of the lock engageable with the end of a rod extending from the variant support;

DESCRIPTION OF THE PREFERRED EMBODIMENT

Figure 1:
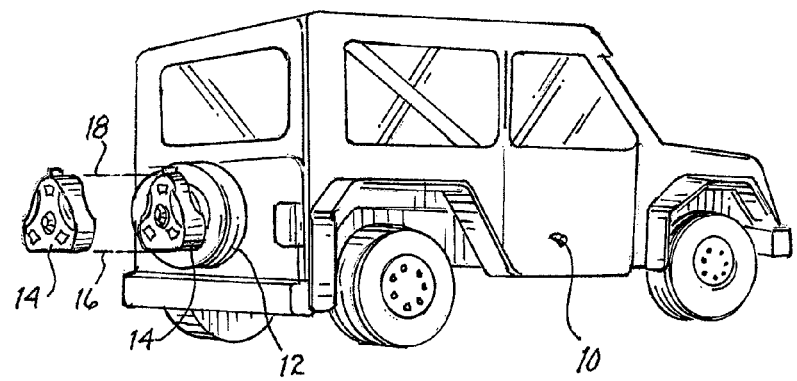
FIG. 1 illustrates a typical vehicle driven on-road and off-road and having the present invention mounted thereon.

Referring to FIG. 1, there is shown a conventional vehicle of the type often used for on-road and off-road travel. A representative vehicle of this type is sold under the name Jeep. It usually includes a spare wheel 12 mounted on threaded lugs extending from a rear panel of vehicle 10. These lugs may also be used to mount a support for one or more removable liquid tanks 14. As represented by dashed lines 16, 18, the liquid tank may be removed rearwardly or mounted forwardly. Such liquid tanks are usually mounted on an off-road vehicle or a vehicle to be taken off-road and contain fuel, such as gasoline or diesel fuel, to ensure that the vehicle is unlikely to become stranded by running out of fuel. As will be described below, more than one liquid tank may be mounted. In such case, the second or further liquid tanks may contain either fuel or water for purposes of survival or to replenish the liquid in the radiator of the vehicle. It is to be understood that any type of liquid may be contained within a liquid tank. For purposes of clarity and simplicity, the liquid tank will be referred to simply as a tank.

Referring jointly to FIGS. 2, 3, 3A and 4, details attendant the support for tank 14 will be described. Spare wheel 12 is mounted on vehicle 10 through a plurality of studs extending through mounting holes and threadedly engaged by nuts 22, as is conventional. A support 24 for the liquid tanks includes studs 26. Each stud includes a threaded end 28 for engagement through an aperture in support 24 and secured thereto by a nut 30 and a washer 31. The other end of the stud includes a threaded cavity 32 for engagement with a respective one of studs 20 extending from the vehicle. For stability purposes, three studs may be used, as illustrated.

Figure 2:
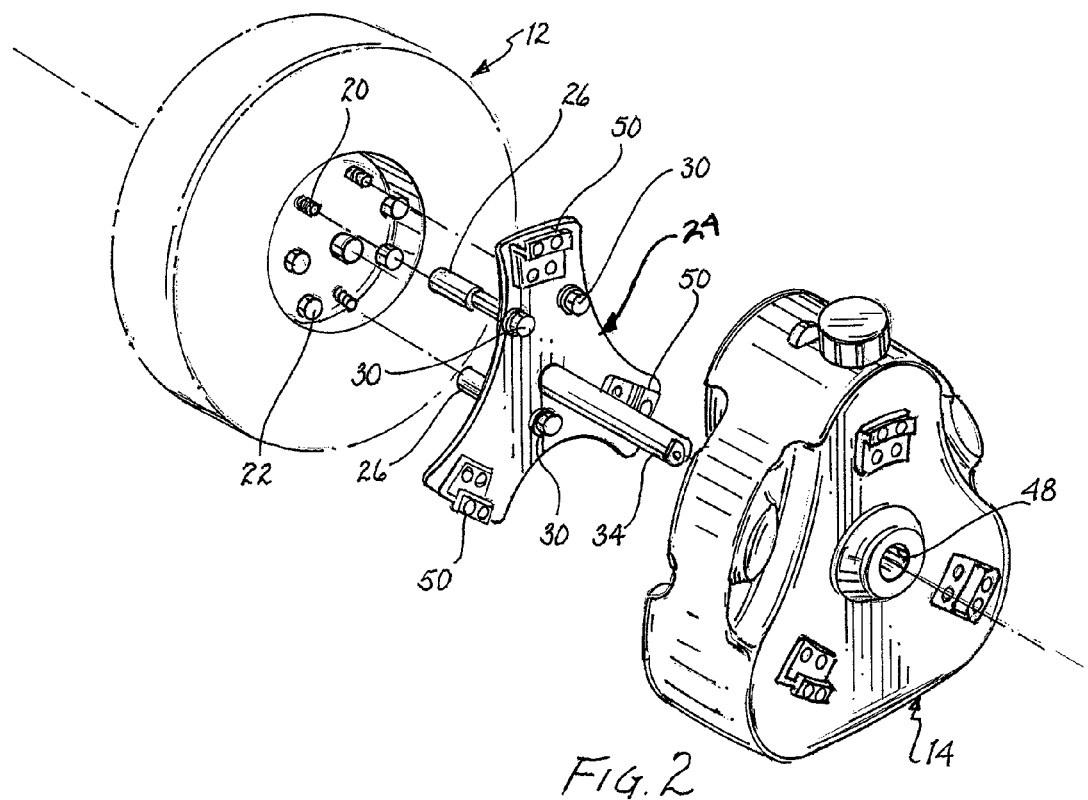
FIG. 2 is an exploded view illustrating a fluid tank mountable on a support attachable to a vehicle on the studs used to support a spare wheel.

A rod 34 is attached to and extends from support 24. It is secured to the support by a nut 36 and a washer 38 threadedly engaging end 40 of the rod. Free end 42 of the rod may include a passageway 44 for engagement by the hasp of a conventional padlock 46. As shown in FIG. 2, tank 14 includes a passageway 48 extending therethrough for penetrably receiving rod 34.

Figure 3:
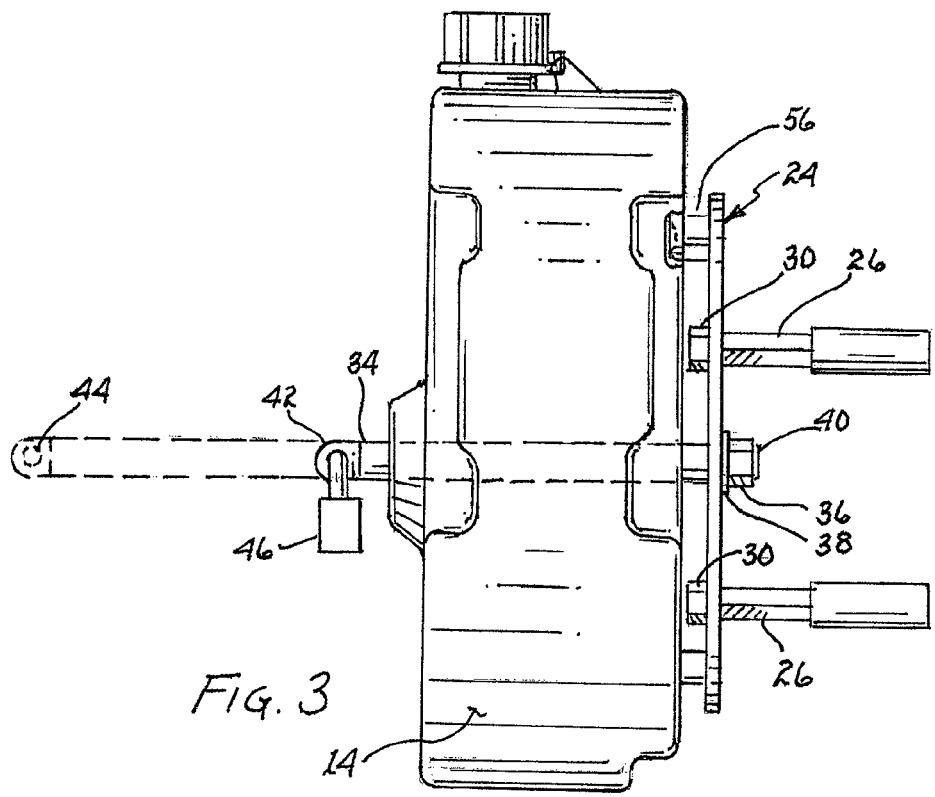
FIG. 3 is a side view of the fluid tank mounted on the support.
Figure 3A:
FIG. 3A is a detail view of the interconnection between the support and the studs extending from the vehicle.
Figure 4:
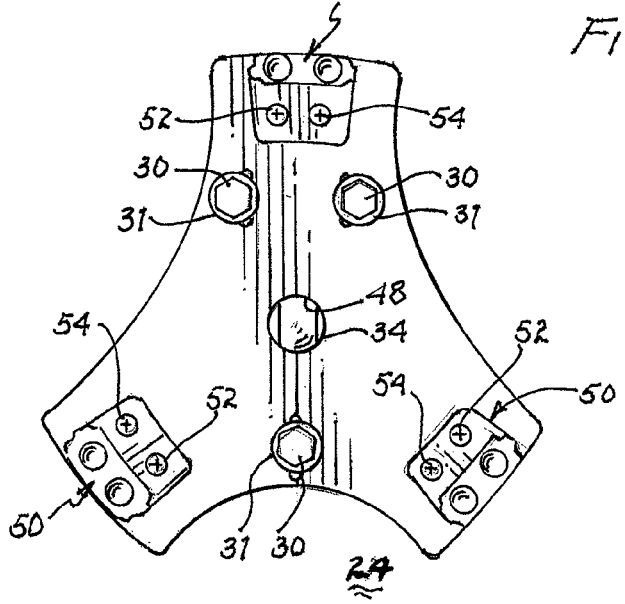
FIG. 4 is a front elevational view of the support.
Figure 5:
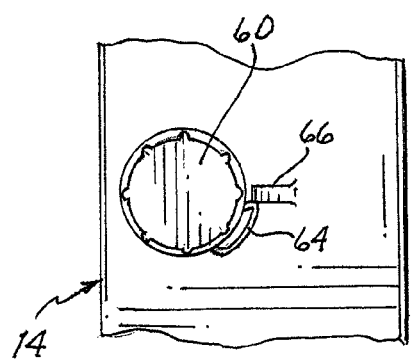
FIG. 5 is a top view of the liquid tank taken along lines 5-5, as shown in FIG. 9.

As will be described in further detail below, snaplock elements positionally secure tank 14 with support 24. Moreover, such snaplock elements secure one tank to another tank also mounted on rod 34. As illustrated in FIG. 4, three male components 50 of three snaplock elements are mounted on support 24 by pairs of screws or bolts 52, 54. Similarly, three female components of the three snaplock elements, of which only one female component is shown in FIG. 3, are mounted on the rear surface of tank 14 to engage a respective one of the male components on the support.

Figure 9:
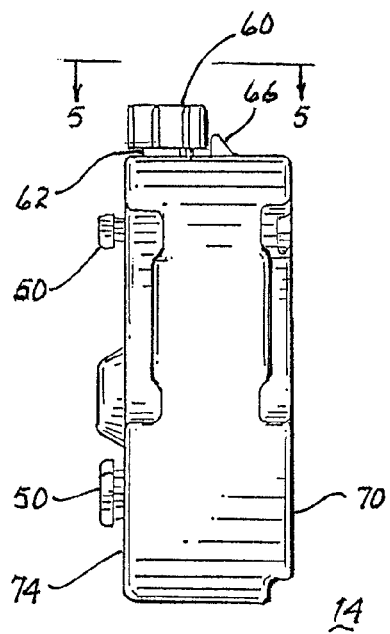
FIG. 9 is a right side elevational view of the liquid tank.
Figure 6:
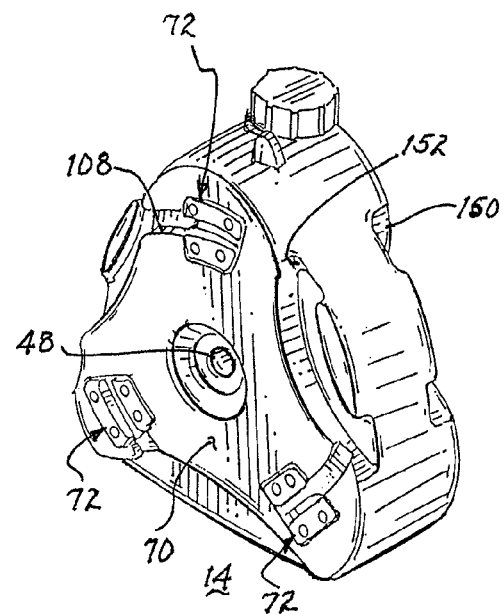
FIG. 6 is an isometric view of the top, rear and right side of the liquid tank.
Figure 7:
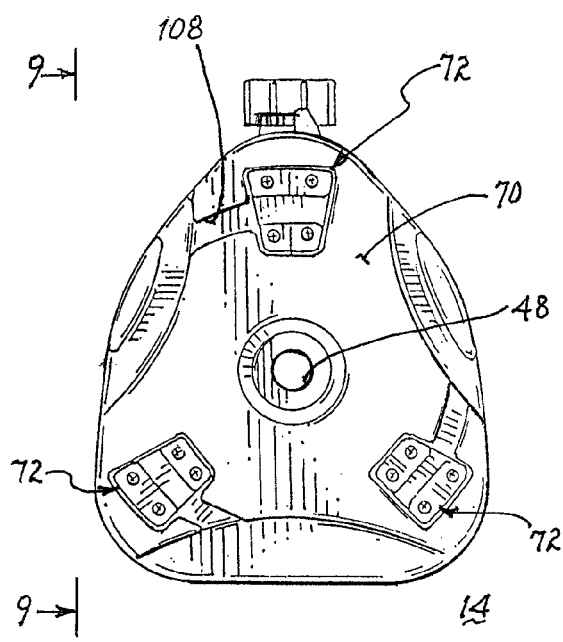
FIG. 7 is a rear elevational view of the liquid tank.
Figure 8:
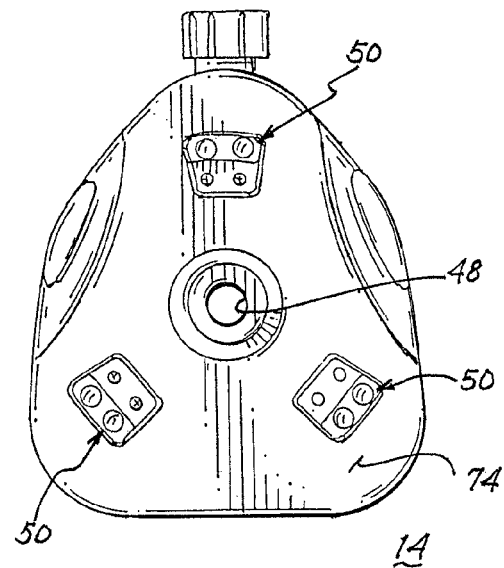
FIG. 8 is a front elevational view of the liquid tank.
Figure 12:
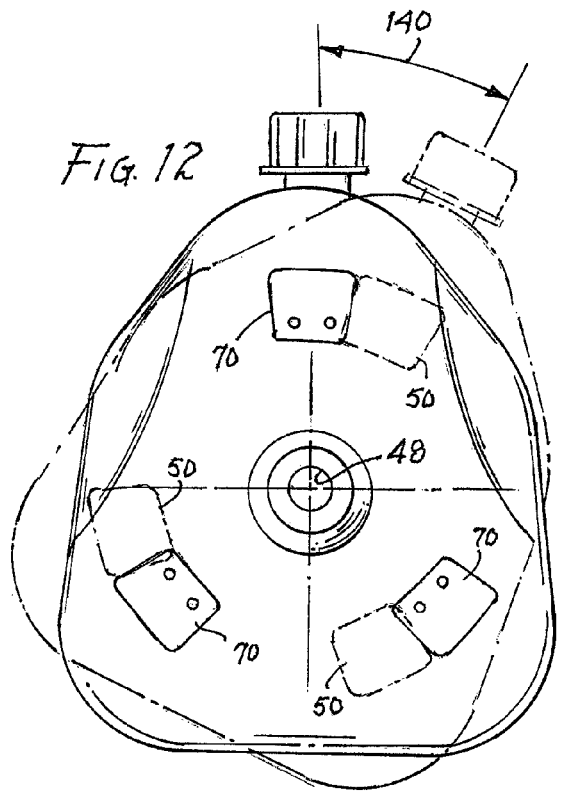
FIG. 12 illustrates rotation of one liquid tank relative to another liquid tank or the support, to engage and disengage three snaplock elements therebetween.

Referring jointly to FIGS. 5, 6, 7, 8 and 9, features attendant tank 14 will be described. Tank 14 includes a cap 60 of the conventional type for threaded engagement with outlet conduit 62 disposed at the top of the tank. A flexible arm 64 extends from cap 60. This arm comes into interfering relationship with stop 66 disposed at the top of the tank. Upon pressing flexible arm 64 toward the cap, it will clear stop 66 and permit unscrewing of the cap and access to outlet conduit 62. As particularly shown in FIGS. 6 and 7, rear side 70 of tank 14 includes female components 72. Each of these female components engages, in a snaplock manner, with a respective one of male components 50 disposed on support 24. As shown in FIGS. 8 and 9, front side 74 of tank 14 includes male components 50. When two or more tanks are stacked adjacent one another on rod 34, these male components engage the corresponding female components on the adjacent tank previously mounted on the rod. Thereby, the tanks are lined with one another through penetrable engagement by rod 34 and adjacent tanks are locked with one another.

FIGS. 10, 11 and 11A illustrate a variant support 80. Many vehicles taken off-road are of a type other than the Jeep-like vehicle shown in FIG. 1. These vehicles may not have studs for engagement by a spare wheel and support 24, as shown and described above. To mount tanks 14 on such a vehicle, variant support 80 may be used. The variant support includes a base 82, which may be a flat section of steel or other relatively robust material. A platform 84 extends from base 82 at an angle of 90 degrees, as shown, or at another angle more suitable for the location to which the variant support is to be attached. Gussets 86 may be incorporated to more robustly secure the base with the platform. As particularly illustrated in FIG. 10, base 82 may be attached to a flat surface 88 such as a section of a bumper on the vehicle. However, surface 88 could be any other surface on the vehicle which would lend itself to attachment of the variant support and the tanks mounted thereon. Representatively, bolts 90 extend through base 82 and surface 88 to secure them with one another by nut 92. A rod 34, like rod 34 shown in FIGS. 2 and 3, is secured to platform 84 by a nut 94 and a washer 96 to threaded end 40 of the rod. As shown in FIGS. 10 and 11, male components 50 of three snaplock elements are attached to platform 84 for engagement with female components 72 of a tank to effect an interlock. A lock, which may be a conventional padlock 98, engages a passageway 44 of rod 34 to prevent removal of tank or tanks 14 from the variant support. As particularly shown in FIG. 11, a second tank is illustrated in dashed lines and represents the possibility of mounting two or more tanks on either support 24 or on variant support 80.

Figure 13:
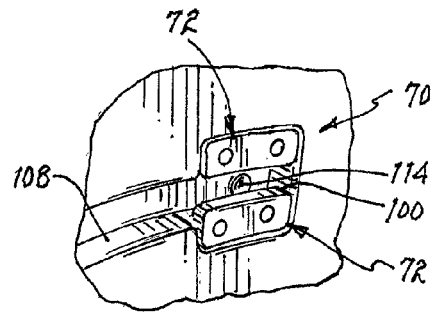
FIG. 13 illustrates a female component of the snaplock element.
Figure 14:
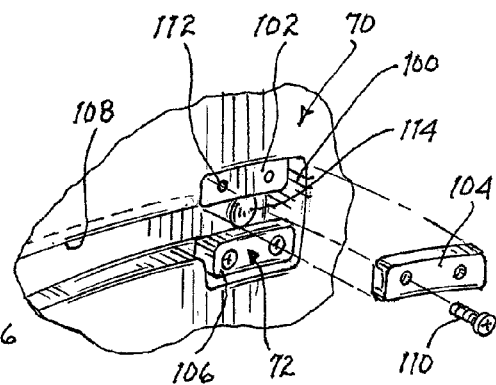
FIG. 14 is a partly exploded view illustrating parts of the female component.

Referring jointly to FIGS. 12 through 17, details and operation of the male and female components constituting a snaplock element will be described in detail. FIGS. 13 and 14 illustrate female component 72 of the snaplock element disposed in rear side 70 of a tank. The female component is formed by an essentially rectangular depression 100 in the rear side. It includes a pair of shelves, of which shelf 102 is illustrated. Each of these shelves supports one of flanges 104, 106. Each of the flanges is secured to the tank by screws or bolts 110 extending through a hole in the respective flange and into threaded engagement with depression 100 in the respective shelf. A circular dimple 114 is formed in the base of depression 100 and essentially centered upon the space between the opposed flanges, as illustrated in FIG. 13. A curved channel 108 extends from depression 100 to the edge of the tank, as illustrated, for example, in FIGS. 6 and 7. The purpose of this slot is to accommodate passage therealong of a part of the male component.

Figure 17:
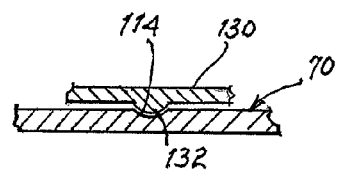
FIG. 17 illustrates the button and the dimple for effecting a snaplock between the male and female components.
Figure 15:
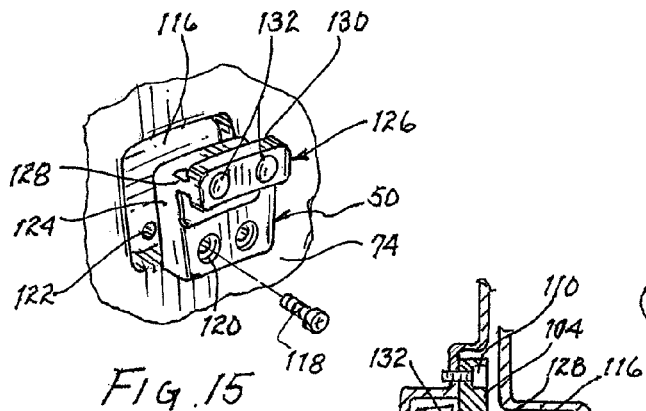
FIG. 15 is a detail view illustrating a male component of the snaplock element.
Figure 16:
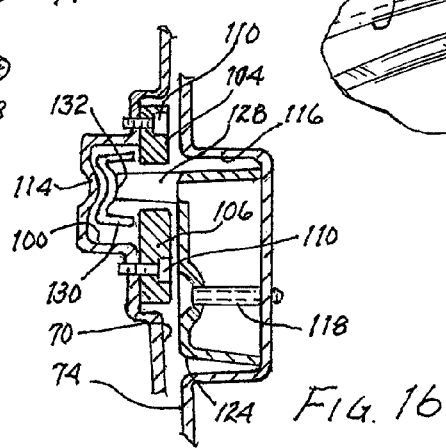
FIG. 16 is a cross-sectional view illustrating the engagement between the male and female components of the snaplock element.

Male component 50 of a snaplock element is primarily illustrated in FIGS. 15 and 16. A depression 116 is formed in front side 74 of the tank. The male component is disposed therein and secured in place by a screw or bolt 118 in penetrable engagement with hole 120 in the male component and into threaded engagement with a cavity 122. Base 124 of the male component supports an extension 126 T-shaped in cross-section. That is, an upright section 128 extends from base 124 to support a cross member 130. The surface of the cross member includes one or more buttons 132 extending therefrom. As shown in FIG. 17, a button 132 mates with dimple 114 upon engagement of the male component with the female component and thereby discourages disengagement therebetween. It is to be noted that the width of cross member 130 is somewhat less than the width of channel 108 to permit sliding engagement of the cross member therealong.

FIG. 16 is a partial cross-sectional view of male component 50 in engagement with female component 72. To lock one tank with another tank or to lock a tank to either support 24 or variant support 80, a first tank is mounted upon rod 34 at an angle 140 (see FIG. 12) necessary to locate cross member 130 of each male component 50 within a corresponding one of channels 108. By rotating the tank relative to the support or the variant support through angle 140, cross member 130 extends into depression 100 of female component 72 and beneath the opposing edges of the respective pair of flanges 104, 106, as shown in FIG. 16. On completion of the insertion of male component 50 within female component 72, button 132 will come into engagement with dimple 114, as shown in FIG. 17. This mating of the button with the dimple will not prevent but will restrain disengagement of the tank from either the support or the variant support.

A similar process is employed to engage a second tank with a first tank already mounted on rod 34 and in engagement with a respective support. The second tank is slid onto the rod at a rotational angle with respect to the first tank, as represented by numeral 140. Such orientation will place the cross member of each of the male components within the respective one of channels 108. Thereafter, the second tank is rotated through angle 140 to bring about locking engagement of the male component with the female component.

The number of tanks to be mounted on rod 34 is simply a function of the length of rod 34. Each of these tanks will be in locking engagement with an adjacent tank and the tank closest to the support or the variant support is in locking engagement therewith.

For storage or other purposes, it is to be understood that two or more tanks may be placed in locking engagement with one another without being mounted on a rod. Such assembly may be particularly useful for storage or transportation purposes whether or not one or more of the tanks is filled with a liquid.

To assist in manipulating a tank whether upon mounting or dismounting the tank from rod 34 or engaging/disengaging one tank with the support or the variant support or with another tank, pairs of channels 150, 152 may be formed in one or more sides of each tank to assist in handling of the tank and to effect rotational movement about the rod and engage or disengage the snaplock elements.

I claim:

1. A tank having a front side and a rear side for housing a fluid, said tank comprising:
    (a) a passageway extending through said tank from the rear side to the front side for mounting said tank upon a rod;
    (b) at least one first snaplock element having a first component disposed on the rear side of said tank for engaging and disengaging a second component disposed on a side of a support for said tank, said at least one first snaplock element comprises three snaplock elements each having said first and second components and disposed about said passageway;
    (c) at least one second snaplock element having a first component disposed on the front side of said tank for engaging and disengaging a second component on the rear side of a further tank, said at least one second snaplock element comprises three snaplock elements each having said first and second components and disposed about said passageway;
    (d) said first component of each of said at least one first snaplock elements comprising a female component;
    (e) said second component of each of said at least one second snaplock elements comprising a male component; and
    (f) the support including three of said second male components and including a channel disposed in said rear side of said tank extending from each of said female components of said at least one first snaplock elements to accommodate translation therethrough of respective ones of said male components mounted upon the support.

2. The tank as set forth in claim 1 including at least one handgrip disposed in said tank for engaging and manipulating said tank.

3. The tank as set forth in claim 1 including a cap threadedly attached to an outlet conduit of said tank and a lock for preventing unwanted unthreading of said cap.

4. A support for a liquid tank having front and rear sides and mountable upon a vehicle, said support comprising:
    (a) means for securing said support to the vehicle;
    (b) a rod extending from said support for supporting the liquid tank to be mounted thereon; and
    (c) at least one component of a snaplock element mounted on the front side of said support for engagement with at least one other component of said snaplock element mounted on the rear side of the liquid tank, said at least one component being one of a male arced component or female arced channel component and said at least one other component being one of a female arced channel component or male arced component, respectively, said at least one component being engageable by said at least one other component upon mounting of the tank upon said rod proximate said support and rotating the tank about said rod to engage said male arced component within said female arced channel component.

5. The support for a liquid tank as set forth in claim 4 wherein said securing means comprises a base of said support for attachment to the vehicle.

6. The support for the tank as set forth in claim 4 wherein said snaplock element includes three snaplock elements each snaplock element having one component mounted on said support and disposed symmetrically about said rod for engagement with another component of each of the three snaplock elements mounted on the rear side of the tank upon rotation of the tank about said rod and proximate said support.

7. A stackable tank and support assembly comprising:
    (a) a support adapted for threadedly engaging and being supported by spare wheel supporting lugs of a vehicle;
    (b) a tank having a front surface and a rear surface and adapted for housing a fluid;
    (c) a rod extending from said support for supporting at least one of said tanks;
    (d) a passageway extending through each of said tanks for penetrably receiving said rod; and
    (e) at least one snaplock element having a first component disposed on the rear surface of each of said tanks and a second component on said support for securing a first one of said tanks with said support upon mounting the first one of said tanks upon said rod, said second component comprising a male component extending from said support and said first component comprising a female component having a channel at least partly disposed in the rear surface of the first one of said tanks for slidably receiving said male component upon rotation of the first one of said tanks about said rod and proximate said support.

8. The assembly as set forth in claim 7 including a second one of said tanks having a further passageway extending through said second tank for penetrably receiving said rod and including a rear surface, at least a further snaplock element disposed on said rear face of said second one of said tanks for securing said second tank with the front surface of said tank, said further snaplock element including a first further component disposed on the rear surface of said second tank and a second further component disposed on the front surface of said tank for engagement by the first further component on the rear surface of said second tank, said second further component comprising a further male component extending from said tank and said first further component comprising a further female component having a further channel at least partly disposed in the rear surface of said second tank for slidably receiving said further male component upon rotation of said second tank about said rod and proximate said tank.

9. The assembly as set forth in claim 8 including a lock for engaging said rod to prevent removal of each of said tanks from said rod.

10. The assembly as set forth in claim 8 including handgrips disposed in the lateral sides of each of said tank and said further tank to assist in engaging and disengaging said further tank with said tank and in engaging and disengaging said tank with said support.

11. The assembly as set forth in claim 8 wherein said at least one snaplock element comprises three snaplock elements disposed symmetrically about said passageway and wherein said at least one further snaplock element comprises three snaplock elements disposed symmetrically about said passageway.

12. The tank as set forth in claim 8 wherein each of said tank and said second tank is generally triangular in shape generally defining three lateral sides and including a handgrip being disposed in at least two lateral sides of each of said tank and said second tank.

13. A fuel tank and support assembly comprising:
(a) a support adapted for threadedly engaging and being supported by spare wheel supporting lugs of a vehicle;
(b) a fuel tank having a front surface and a rear surface and adapted for housing fuel;
(c) a rod extending from said support;
(d) a passageway extending through said fuel tank for penetrably receiving said rod; and
(e) at least one snaplock element having a first component on the rear surface of said fuel tank and a second component on said support for securing said fuel tank with said support upon mounting said fuel tank upon said rod, said second component comprising a male component extending from said support and said first component comprising a female component having a channel at least partly disposed in the rear surface of said fuel tank for slidably receiving said male component upon rotation of said fuel tank about said rod and proximate said support.

14. The fuel tank and support assembly as set forth in claim 13 including a further fuel tank having a further passageway extending through said further fuel tank for penetrably receiving said rod and including a rear surface, at least one further snaplock element for securing said further fuel tank with said fuel tank, said further snaplock element including a first further component on the rear surface of said further fuel tank and a second further component on the front surface of said fuel tank for engagement with the first further component on the rear surface of said further fuel tank, said second further component comprising a further male component extending from said fuel tank and said first further component comprising a further female component having a further channel at least partly disposed in the rear surface of said further fuel tank for slidably receiving said further male component upon rotation of said further fuel tank about said rod and proximate said fuel tank.

15. The fuel tank and support assembly as set forth in claim 14 including handgrips disposed in the lateral sides of said fuel tank and said further fuel tank to assist in engaging and disengaging said further fuel tank with said fuel tank and in engaging and disengaging said fuel tank with said support.

16. The fuel tank and support assembly as set forth in claim 14 wherein said at least one further snaplock element comprises three snaplock elements disposed symmetrically about said passageway.

17. The fuel tank as set forth in claim 14 wherein each of said fuel tank and said further fuel tank is generally triangular in shape generally defining three lateral sides and including a handgrip being disposed in at least two lateral sides of each of said fuel tank and said further fuel tank.

18. The fuel tank and support assembly as set forth in claim 13 including a lock for engaging said rod to prevent removal of said fuel tank from said rod.

19. The fuel tank and support assembly as set forth in claim 13 wherein said at least one snaplock element comprises three snaplock elements disposed symmetrically about said passageway.

* * * * *